UNITED STATES PATENT OFFICE.

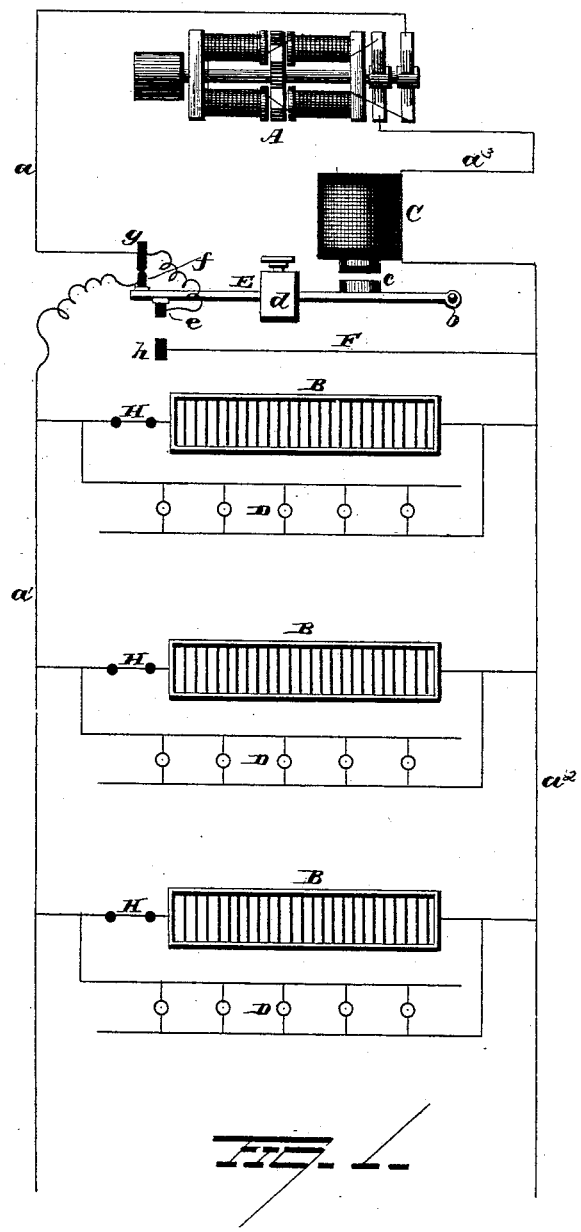

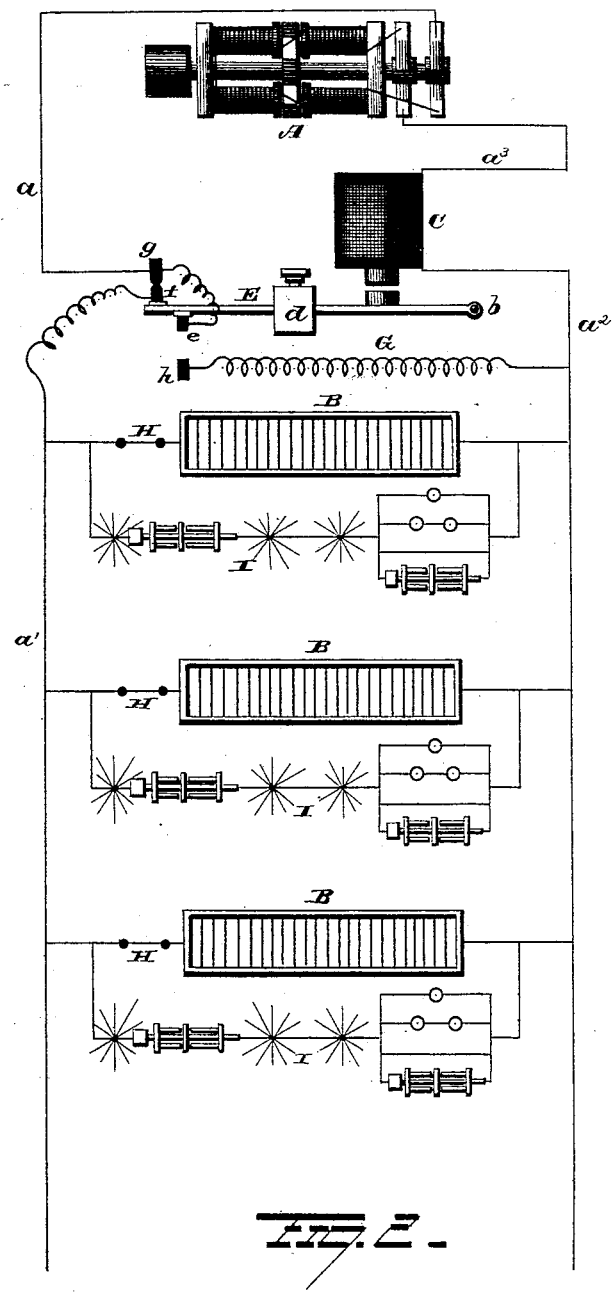

CHARLES F. BRUSH, OF CLEVELAND, OHIO, ASSIGNOR TO THE BRUSH ELECTRIC COMPANY, OF SAME PLACE.

SECONDARY-BATTERY CHARGING.

SPECIFICATION forming part of Letters Patent No. 395,379, dated January 1, 1889.

Original application filed June 13, 1882, Serial No. 64,033. Divided and this application filed December 11, 1883. Serial No. 114,210. (No model.) Patented in England July 1, 1882, No. 3,108; in Belgium July 22, 1882, No. 58,539; in Germany July 25, 1882, No. 24,582; in France July 26, 1882, No. 150,318; in Russia August 5, 1882, No. 5,699; in Italy September 30, 1882, No. 14,453; in Victoria November 13, 1882, No. 3,344; in Cape of Good Hope December 15, 1882, No. 11/121; in South Australia December 20, 1882, No. 318; in Spain February 1, 1883, No. 3,478; in Austria-Hungary April 15, 1883, No. 3,604; in Portugal May 2, 1883, No. 841; in India May 8, 1883, No. 170/82, and in New South Wales June 27, 1883, No. 1,262.

*To all whom it may concern:*

Be it known that I, CHARLES F. BRUSH, of Cleveland, in the county of Cuyahoga and State of Ohio, have invented certain new and useful Improvements in Secondary-Battery Charging; and I do hereby declare the following to be a full, clear, and exact description of the invention, such as will enable others skilled in the art to which it appertains to make and use the same.

My invention relates to the distribution and automatic manipulation of the current employed in charging secondary batteries or apparatus for the storage of electrical energy; and it consists in the combination, with an electric generator, a main or charging circuit, and two or more secondary batteries connected or associated with the main or charging circuit in "multiple arc," of mechanism actuated and controlled by the current for automatically and simultaneously switching all of said batteries into the charging-circuit.

The invention further consists in the combination, with an electric generator, a main or charging circuit, and two or more secondary batteries connected or associated with the main or charging circuit in multiple arc, of mechanism actuated and controlled by the current for automatically and simultaneously switching all of said batteries out of the charging-circuit.

The invention further consists in certain other improvements in the arrangement and combinations of parts in a system for charging secondary batteries, as will hereinafter be explained, and specified in the claims.

In the accompanying drawings, Figure 1 illustrates a system embodying my invention. Fig. 2 is a similar system having a resistance included in the circuit around the batteries.

A represents a current-generator, which may consist of a dynamo or magneto-electric machine, thermo-electric, or other apparatus capable of furnishing an electric current.

B represents secondary batteries of any approved type or construction.

C is an electro-magnet located in the circuit $a\ a'\ a^2\ a^3$, connecting the generator and secondary batteries.

D represents a number of electric lamps, either arc or incandescent, or other translating devices, such as motors or other devices.

E is a lever, which is pivoted at $b$ and provided with an armature, $c$, facing the pole or poles of the magnet C. The lever E may be provided with an adjustable weight, $d$. The free end of the lever carries contact-points $e\ f$, which are insulated from each other. To the charging-circuit $a$ is electrically connected a stationary contact-point, $g$, which makes contact with $f$, and serves as a stop to the lever E when the latter rises in obedience to the attraction of the magnet C. Contact $e$ is electrically connected with the charging-circuit by means of a suitable flexible connection, as shown. Contact $f$ is also connected by a flexible conductor with the section $a'$ of the charging-circuit. A conductor, F, of low resistance is electrically connected at one end with the section $a^2$ of the charging-circuit, and at its opposite end is provided with a stationary contact-point, $h$, which makes contact with $e$ and serves as a stop to the lever E when the latter falls.

A conductor of fusible metal, H, may be employed for the purpose of opening that part of the circuit which is connected to the charging and discharging circuit by fusion, if the charging or discharging current becomes greatly abnormal in quantity from any cause.

In the drawings the lever E is shown in the position which it occupies while the generator A is charging the batteries B. The current passes from the generator through the line $a$, contacts $g\ f$, line $a'$, conductors H, batteries B, line $a^2$, magnet C, and line $a^3$, back to the generator. When the charging-current stops or becomes greatly reduced, the magnet C being no longer able to support or uphold its lever E, the latter drops, separating the contacts $g\ f$ and making contact between $e$ and $h$. Thus the batteries are disconnected at one end from the charging-line $a$, and the circuit of the generator is completed through other paths, viz: through the line $a$, contacts $e\ h$, conductor F, line $a^2$, magnet C, and line $a^3$. When the charging-current is again started, the magnet C raises the lever E into the position shown, and the charging of the batteries is resumed.

The translating devices D (shown in Fig. 1 as arranged in multiple arc) and the translating devices I (shown in Fig. 2 as arranged both in multiple arc and "in series") are operated by the discharge of the batteries B when the charging-current from the generator is not acting. If they are left in circuit while the charging-current is acting, they may be regarded as being operated wholly or in part by the charging-current direct. If they require less than the charging-current, the excess of the latter will pass through the battery, augmenting its charge. If they require more than the charging-current, the latter will be supplemented and re-enforced by a discharge from the battery. Instead of using the low conductor F, the resistance G, as shown in Fig. 2, may be employed, and may be made adjustable, if desired. The contact-points $e$, $f$, $g$, and $h$ are preferably made of carbon—such as is used in electric-arc lighting—so that their surfaces may not become impaired by the sparks which may occur between them. Obviously an axial magnet with movable core may be employed instead of the form shown at C. When the lever E rises, a spark or arc must form between the points $e$ and $h$ during the time the lever is moving and until contact is established between $f$ and $g$. The ultimate distance apart of $e$ and $h$ is so adjusted that the resistance to the passage of current offered by the spark or arc between these points is considerable, or even greater than that offered by the batteries B, so that when $f$ and $g$ make contact, the passage of current between $e$ and $h$ ceases. When a resistance, G, is placed in the "short circuit," the points $e\ h$ may be worked at a less separation and the spark or arc between them greatly reduced, owing to the fact that the resistance replaces more or less of that which was in the first instance necessarily in the spark between $e$ and $h$.

From the foregoing explanation it will be observed that when the current is not acting in the charging-circuit all the batteries B will be open-circuited or disconnected from the charging-circuit, and the latter will be "short-circuited" around all of said batteries; also when the charging-current is established in the charging circuit or line the short circuit around the batteries will be opened and all of the batteries will be thrown or automatically switched into the charging-circuit. Again, when the charging-current stops, all of the batteries will be automatically switched out of the charging-circuit, and the latter short-circuited, as at first. These automatic operations prevent the inverse discharge of the batteries through the charging line or circuit when the charging-current is discontinued, prevent reversal of polarity in the dynamo-machine when such is employed for charging, and leave a closed circuit for the charging-current to re-establish itself in when recharging or continued charging of the batteries is desired.

This application is a division of my original application, designated as "Case T," filed June 13, 1882, Serial No. 64,033, and, for the sake of distinguishing it from other applications, is designated as "Division C of Case T."

The invention described and claimed in my original application referred to relates, broadly, to devices or mechanism for automatically controlling and manipulating the charging-current, and is not confined to any particular arrangement or association of the batteries with respect to the charging-circuit, and I make no claim in this case to such broad subject-matter, as in this application the invention shown, described, and claimed relates to a separate and distinct improvement consisting in the relative arrangement of the batteries, charging-circuit, and an automatic switching mechanism or manipulator, substantially as hereinbefore set forth, and as will be specified in the claims, and is not restricted or limited to any particular construction and arrangement of parts for automatically switching or manipulating the charging-currents.

The invention herein described and claimed is described, but not specifically claimed, in patents granted in the following foreign countries: England, No. 3,108, July 1, 1882; France, No. 150,318, July 26, 1882; Belgium, No. 58,539$^B$, July 22, 1882; Germany, No. 24,582, July 25, 1882; Italy, No. 14,453, September 30, 1882; Austria, No. 3,604, April 15, 1883; Russia, No. 5,699, August 5, 1882; Spain, No. 3,478, February 1, 1883, Portugal, No. 841, May 2, 1883; Cape of Good Hope, 11/121, December 15, 1882; India, 170/82, May 8, 1883; New South Wales, No. 1,262, June 27, 1883; Victoria, No. 3,344, November 13, 1882; South Australia, No. 318, December 20, 1882.

Having fully described my invention, what I claim as new, and desire to secure by Letters Patent, is—

1. The combination, with an electrical generator, a main or charging circuit, and two or more secondary batteries, each included in an independent multiple-arc branch circuit of the main or charging circuit, each secondary battery having a discharging or working circuit connected therewith, of a switch for electrically connecting and disconnecting all of said secondary batteries and the main or charging circuit, and an electro-magnet constructed and arranged to actuate the switch and automatically and simultaneously switch all said batteries into the charging-circuit, substantially as set forth.

2. The combination, with an electrical generator, a main or charging circuit, and two or more secondary batteries, each included in an independent multiple-arc branch circuit of the main or charging circuit, each secondary battery having a discharging or working circuit connected therewith, of a switch for electrically connecting and disconnecting all of said secondary batteries and the main or charging circuit, and an electro-magnet constructed and arranged to actuate the switch and automatically and simultaneously switch all said batteries out of the charging-circuit, substantially as set forth.

3. The combination, with an electrical generator, a main or charging circuit, and two or more secondary batteries, each included in an independent multiple-arc branch circuit of the main or charging circuit, each secondary battery having a discharging or working circuit, of a switch for electrically connecting and disconnecting all said batteries and the main or charging circuit, and a circuit around all said batteries adapted to be opened and closed by said switch, and an electro-magnet included in the charging-circuit and arranged to actuate said switch and automatically and simultaneously switch all said batteries out of the charging-circuit when the current stops or becomes sufficiently reduced and establish a circuit for the charging-current around all said batteries, substantially as set forth.

4. The combination, with an electrical generator, a main or charging circuit, and two or more secondary batteries, each included in an independent multiple-arc branch of the main or charging circuit, each secondary battery having a discharging or working circuit, of a circuit adapted to be closed around all said batteries, and an electro-magnet included in the charging-circuit and arranged to actuate said switch and automatically establish a closed circuit for the charging-current around all said batteries when the charging-current stops or becomes sufficiently reduced, substantially as set forth.

5. The combination, with an electrical generator, a main or charging circuit, and two or more secondary batteries, each included in an independent multiple-arc branch of the main or charging circuit, each secondary battery having a discharging or working circuit, of a switch constructed and arranged to electrically connect and disconnect the batteries and the charging-circuit, a short circuit including a resistance around all said batteries adapted to be opened and controlled by said switch, and an electro-magnet constructed and arranged to actuate said switch and automatically and simultaneously switch all said batteries out of the charging-circuit and establish a circuit including the resistance around all said batteries, substantially as set forth.

6. A system embracing a suitable electric generator, a main or charging circuit, and two or more secondary batteries, each included in an independent multiple-arc branch of the main or charging circuit, each battery being provided with a discharging or working circuit, of a short circuit adapted to be opened and closed, and a switch included in the charging-circuit and arranged to simultaneously switch all said batteries into and out of the charging-circuit, and an electro-magnet constructed and arranged to actuate the switch and automatically and simultaneously switch all of the batteries out of the charging-circuit and establish a circuit around said batteries when the charging-current ceases or becomes sufficiently reduced, and for opening said short circuit and switching all of said batteries into the charging-circuit when the charging-current is re-established, substantially as set forth.

In testimony whereof I have signed this specification in the presence of two subscribing witnesses.

CHARLES F. BRUSH.

Witnesses:
LEVERETT L. LEGGETT,
ALBERT E. LYNCH.